United States Patent
O'Reilly, Jr.

(10) Patent No.: US 12,093,728 B2
(45) Date of Patent: **\*Sep. 17, 2024**

(54) QUEUE MANAGEMENT SYSTEM AND METHOD

(71) Applicant: EMC IP Holding Company, LLC, Hopkinton, MA (US)

(72) Inventor: Daniel K. O'Reilly, Jr., Framingham, MA (US)

(73) Assignee: EMC IP Holding Company, LLC, Hopkinton, MA (US)

( \* ) Notice: Subject to any disclaimer, the term of this patent is extended or adjusted under 35 U.S.C. 154(b) by 649 days.

This patent is subject to a terminal disclaimer.

(21) Appl. No.: 17/243,421

(22) Filed: Apr. 28, 2021

(65) Prior Publication Data

US 2022/0350645 A1 Nov. 3, 2022

(51) Int. Cl.
  *G06F 3/00* (2006.01)
  *G06F 3/06* (2006.01)
  *G06F 9/48* (2006.01)

(52) U.S. Cl.
  CPC .......... *G06F 9/4881* (2013.01); *G06F 3/0604* (2013.01); *G06F 3/0656* (2013.01); *G06F 3/0659* (2013.01); *G06F 3/067* (2013.01)

(58) Field of Classification Search
  CPC ..................................... G06F 9/455
  See application file for complete search history.

(56) References Cited

U.S. PATENT DOCUMENTS

| | | | | |
|---|---|---|---|---|
| 4,975,975 A | * | 12/1990 | Filipski | G06F 18/21 382/227 |
| 5,930,522 A | * | 7/1999 | Fant | G06F 8/31 712/25 |
| 6,295,539 B1 | * | 9/2001 | Isip, Jr. | G06F 16/24565 707/999.102 |
| 9,280,389 B1 | * | 3/2016 | Lipsio, Jr. | G06F 9/4881 |
| 11,528,232 B1 | * | 12/2022 | Zhang | H04L 47/6295 |
| 2008/0170538 A1 | * | 7/2008 | Duggi | H04L 45/16 370/328 |
| 2010/0161793 A1 | * | 6/2010 | Young Hwan | G06F 15/16 709/224 |

(Continued)

FOREIGN PATENT DOCUMENTS

| | | | | |
|---|---|---|---|---|
| CN | 110807028 A | * | 2/2020 | ......... G06F 16/9027 |
| JP | H05250179 A | * | 9/1993 | |

(Continued)

OTHER PUBLICATIONS

Greg Franks, Layered Queueing Network Solver and Simulator User Manual. (Year: 2005).*

(Continued)

*Primary Examiner* — Lechi Truong
(74) *Attorney, Agent, or Firm* — Brian J. Colandreo; Heath M. Sargeant; Holland & Knight LLP (57) ABSTRACT

A method, computer program product, and computing system for: receiving a new request on an IT computing device; and determining whether the new request on the IT computing device should be immediately processed or queued in a pending queue for subsequent processing based, at least in part, upon: a root request limit of the IT computing device, a global request limit of the IT computing device, and a sibling status of the new request.

16 Claims, 5 Drawing Sheets

(56) References Cited

U.S. PATENT DOCUMENTS

| | | | |
|---|---|---|---|
| 2012/0020223 A1* | 1/2012 | Sonnier | H04L 49/254 |
| | | | 370/235.1 |
| 2012/0020367 A1* | 1/2012 | Aulakh | H04L 49/506 |
| | | | 370/412 |
| 2012/0159516 A1* | 6/2012 | Villadsen | G06F 9/542 |
| | | | 719/318 |
| 2013/0054877 A1* | 2/2013 | Yeh | G06F 12/0246 |
| | | | 711/E12.008 |
| 2014/0173176 A1* | 6/2014 | Kang | G06F 12/0246 |
| | | | 711/103 |
| 2016/0210087 A1* | 7/2016 | Amir | G06F 3/126 |
| 2017/0052976 A1* | 2/2017 | Verma | G06F 16/24552 |
| 2019/0213776 A1* | 7/2019 | Banerjee | G06F 9/4881 |
| 2019/0294715 A1* | 9/2019 | Gupta | G06F 9/544 |
| 2020/0376976 A1* | 12/2020 | Ahtikari | H02J 7/00 |
| 2021/0096921 A1* | 4/2021 | Banerjee | G06F 9/4881 |
| 2021/0389983 A1* | 12/2021 | Blue | G06F 9/465 |
| 2023/0245080 A1* | 8/2023 | Anderson | G06Q 20/3825 |
| | | | 705/75 |

FOREIGN PATENT DOCUMENTS

| | | | | |
|---|---|---|---|---|
| JP | 2001282555 A | * | 10/2001 | |
| WO | WO-2020172508 A1 | * | 8/2020 | G06F 17/18 |

OTHER PUBLICATIONS

Miguel Castro1, SplitStream: High-Bandwidth Multicast in Cooperative Environments. (Year: 2003).*

Greg Franks, Layered Queueing Network Solver and Simulator User Manual, (Year: 2022).*

* cited by examiner

QUEUE MANAGEMENT SYSTEM AND METHOD

TECHNICAL FIELD

This disclosure relates to storage management systems and, more particularly, to systems and methods for managing queues within storage management systems.

BACKGROUND

Storing and safeguarding electronic content is of paramount importance in modern business. Accordingly, various methodologies may be employed to protect and distribute such electronic content within storage management systems. As could be imagined, during the operation of such storage management systems, various requests may be made of such systems, wherein some of these requests may be of higher importance than others. Further, as these storage management systems have a finite amount of resources to address such requests, not all of these requests may be processed simultaneously.

SUMMARY OF DISCLOSURE

Concept 1 (Queuing)

In one implementation, a computer-implemented method is executed on a computing device and includes: receiving a new request on an IT computing device; and determining whether the new request on the IT computing device should be immediately processed or queued in a pending queue for subsequent processing based, at least in part, upon: a root request limit of the IT computing device, a global request limit of the IT computing device, and a sibling status of the specific request.

One or more of the following features may be included. The root request limit may be the maximum number of requests that may concurrently be running on the IT computing device when adding a new root request. The global request limit may be the maximum number of requests that may concurrently be running on the IT computing device when adding any new request. The sibling status of the specific request may define whether the specific request has any siblings. The new request may be a root request and determining whether the new request should be immediately processed or queued in a pending queue for subsequent processing may include determining whether the processing of the new request would result in exceeding the root request limit of the IT computing device. The new request may not be a root request and determining whether the new request should be immediately processed or queued in a pending queue for subsequent processing may include determining whether the processing of the new request would result in exceeding the global request limit of the IT computing device. The new request may not be a root request and determining whether the new request should be immediately processed or queued in a pending queue for subsequent processing may include immediately processing the new request if the sibling status of the new request indicates that the new request has no siblings. The new request may not be a root request and determining whether the new request should be immediately processed or queued in a pending queue for subsequent processing may include queuing the new request in the pending queue if the sibling status of the new request indicates that the new request has one or more siblings. The one or more siblings may include: one or more requests currently being processed by the IT computing device; and/or one or more requests waiting in the pending queue to be processed by the IT computing device.

In another implementation, a computer program product resides on a computer readable medium and has a plurality of instructions stored on it. When executed by a processor, the instructions cause the processor to perform operations including: receiving a new request on an IT computing device; and determining whether the new request on the IT computing device should be immediately processed or queued in a pending queue for subsequent processing based, at least in part, upon: a root request limit of the IT computing device, a global request limit of the IT computing device, and a sibling status of the specific request.

One or more of the following features may be included. The root request limit may be the maximum number of requests that may concurrently be running on the IT computing device when adding a new root request. The global request limit may be the maximum number of requests that may concurrently be running on the IT computing device when adding any new request. The sibling status of the specific request may define whether the specific request has any siblings. The new request may be a root request and determining whether the new request should be immediately processed or queued in a pending queue for subsequent processing may include determining whether the processing of the new request would result in exceeding the root request limit of the IT computing device. The new request may not be a root request and determining whether the new request should be immediately processed or queued in a pending queue for subsequent processing may include determining whether the processing of the new request would result in exceeding the global request limit of the IT computing device. The new request may not be a root request and determining whether the new request should be immediately processed or queued in a pending queue for subsequent processing may include immediately processing the new request if the sibling status of the new request indicates that the new request has no siblings. The new request may not be a root request and determining whether the new request should be immediately processed or queued in a pending queue for subsequent processing may include queuing the new request in the pending queue if the sibling status of the new request indicates that the new request has one or more siblings. The one or more siblings may include: one or more requests currently being processed by the IT computing device; and/or one or more requests waiting in the pending queue to be processed by the IT computing device.

In another implementation, a computing system includes a processor and memory and is configured to perform operations including: receiving a new request on an IT computing device; and determining whether the new request on the IT computing device should be immediately processed or queued in a pending queue for subsequent processing based, at least in part, upon: a root request limit of the IT computing device, a global request limit of the IT computing device, and a sibling status of the specific request.

One or more of the following features may be included. The root request limit may be the maximum number of requests that may concurrently be running on the IT computing device when adding a new root request. The global request limit may be the maximum number of requests that may concurrently be running on the IT computing device when adding any new request. The sibling status of the specific request may define whether the specific request has any siblings. The new request may be a root request and determining whether the new request should be immediately processed or queued in a pending queue for subsequent processing may include determining whether the processing of the new request would result in exceeding the root request limit of the IT computing device. The new request may not be a root request and determining whether the new request should be immediately processed or queued in a pending queue for subsequent processing may include determining whether the processing of the new request would result in exceeding the global request limit of the IT computing device. The new request may not be a root request and determining whether the new request should be immediately processed or queued in a pending queue for subsequent processing may include immediately processing the new request if the sibling status of the new request indicates that the new request has no siblings. The new request may not be a root request and determining whether the new request should be immediately processed or queued in a pending queue for subsequent processing may include queuing the new request in the pending queue if the sibling status of the new request indicates that the new request has one or more siblings. The one or more siblings may include: one or more requests currently being processed by the IT computing device; and/or one or more requests waiting in the pending queue to be processed by the IT computing device.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
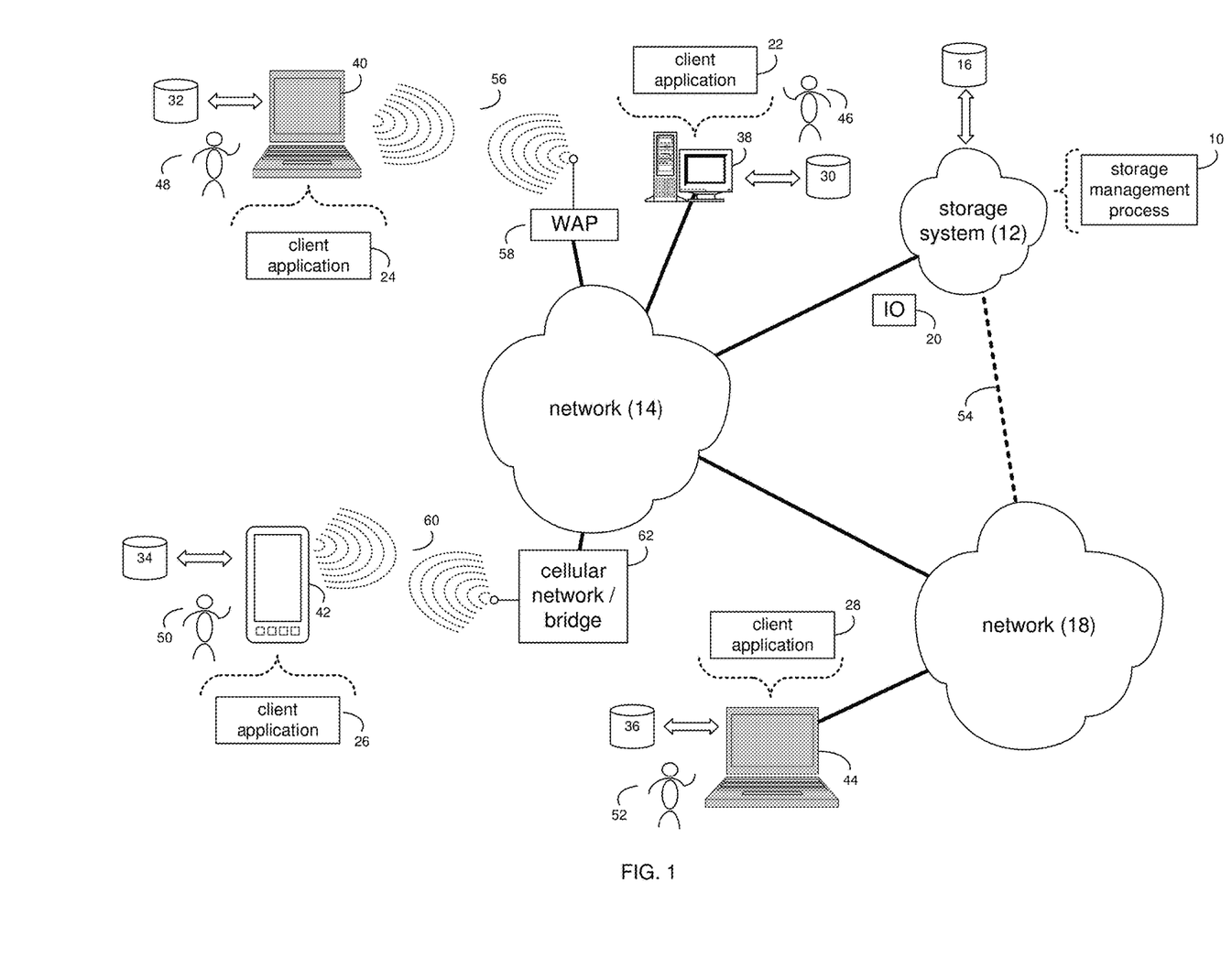
FIG. 1 is a diagrammatic view of a storage system and a storage management process coupled to a distributed computing network.

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a storage appliance, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

The Data Storage System

Figure 2:
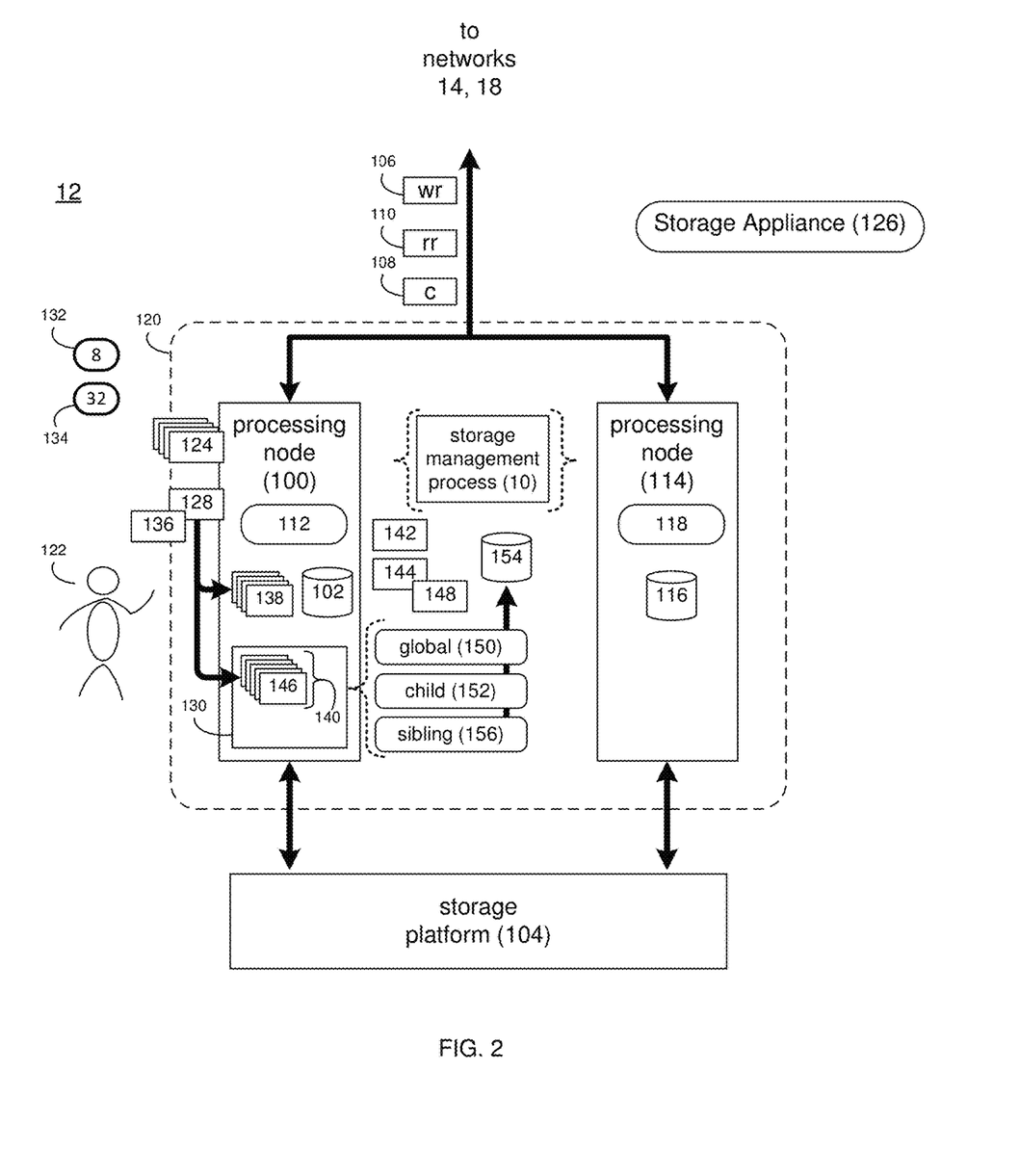
FIG. 2 is a diagrammatic view of the storage system of FIG. 1.

Referring also to FIG. 2, there is shown a general implementation of storage system 12. In this general implementation, storage system 12 may include processing node 100.

An example of processing node 100 may include but is not limited to a processing node within a storage appliance. As is known in the art, a storage appliance is a type of computing appliance that provides data to (or manages data for) other network-connected computing devices. Processing node 100 may be configured to perform computational tasks and may be configured to store data locally (on local storage 102) or within storage platform 104.

Depending upon the manner in which storage system 12 is configured, storage platform 104 may include a single storage device (such as a single hard disk drive or a single solid state storage device) or may include a plurality of storage devices that are configured to provide various levels of performance and/or high availability. For example and if storage platform 104 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 102) coupled to e.g., processing node 100, may be executed by one or more processors (not shown) and one or more memory architectures (not shown) included within processing node 100. Storage device 102 may include but is not limited to: a hard disk drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 106 (i.e. a request that content 108 be written to storage system 12) and data read request 110 (i.e. a request that content 108 be read from storage system 12).

During operation of processing node 100, content 108 to be written to storage system 12 may be processed by processing node 100. Additionally/alternatively and when storage system 12 is configured as an application server, content 108 to be written to storage system 12 may be internally generated by processing node 100.

Processing node 100 may include cache memory system 112. Examples of cache memory system 112 may include but are not limited to a volatile, solid-state, cache memory system (e.g., a static RAM cache memory system) and/or a non-volatile, solid-state, cache memory system (e.g., a flash-based, cache memory system). Processing node 100 may initially store content 108 within cache memory system 112. Depending upon the manner in which cache memory system 112 is configured, processing node 100 may immediately write content 108 to local storage 102 or storage platform 104 (if cache memory system 112 is configured as a write-through cache) or may subsequently write content 108 to local storage 102 or storage platform 104 (if cache memory system 112 is configured as a write-back cache).

Storage system 12 may be configured to include a plurality of processing nodes, each of which may be configured to receive, generate and/or process content (e.g., content 108). For example and in addition to processing node 100, storage system 12 may include one or more additional processing nodes (e.g., processing node 114). An example of processing node 114 may include a processing node within a storage appliance. Processing node 114 may be configured to perform computational tasks and may be configured to store data locally (on local storage 116) or within storage platform 104.

Processing node 114 may include cache memory system 118. Examples of cache memory system 118 may include but are not limited to a volatile, solid-state, cache memory system (e.g., a static RAM cache memory system) and/or a non-volatile, solid-state, cache memory system (e.g., a flash-based, cache memory system). Processing node 114 may initially store content 108 within cache memory system 118. Depending upon the manner in which cache memory system 118 is configured, processing node 114 may immediately write content 108 to local storage 116 or storage platform 104 (if cache memory system 118 is configured as a write-through cache) or may subsequently write content 108 to local storage 116 or storage platform 104 (if cache memory system 118 is configured as a write-back cache).

Processing node 100 and (in this example) processing node 114 may be included within a single storage appliance (e.g., storage appliance 120), thus allowing storage appliance 120 to provide a level of high availability. Processing nodes 110, 114 may be configured so that one node is a primary node and the other node is a secondary node.

Storage Management Process

During operation of storage system 12, storage appliance 120 may implement various processes. Examples of such processes may include but are not limited to: a process to create a logical storage device (e.g., a LUN) on storage appliance 120, a process to implement a replication procedure of storage appliance 120, a process to generate a snapshot of storage device 102, and a process to perform a virus/malware scan of storage appliance 102.

In order to effectuate such processes, an administrator (e.g., administrator 122) of storage appliance 120 or an application (not shown) executed on storage appliance 120 may issue one or more requests (e.g., requests 124). Some of these requests may be stand alone requests that are designed to effectuate simple processes. For example, a simple process to reset the password of a user may be effectuated via one request. However, some processes may be more complex and may require multiple requests and/or sub-requests. For example, if the process to be effectuated is the replication of a logical storage unit onto remote storage appliance 126, the process may require multiple requests that may include one or more sub-requests. Specifically, such a replication request may include e.g., a first sub-request to define a LUN target on remote storage appliance 126, a second sub-request to copy the data from storage appliance 120 to remote storage appliance 126, and a third sub-request to error-check the replication copy on remote storage appliance 126.

Since storage appliance 120 may have a limited number of resources, storage appliance 120 may not be capable of simultaneously executing an unlimited number of requests. Accordingly and as will be discussed below in greater detail, storage management process 10 may be configured to immediately process some requests while queueing other requests for subsequent prosecution.

As discussed above, these requests (e.g., requests 124) may be top-level requests (which may be referred to as root requests) and subordinate requests (which may be referred to as child requests). For example and referring also to FIG. 3, a root-level replication request (e.g., root request 200) may include a plurality of child-level subordinate requests (e.g., child requests 202, 204, 206). Further, these child-level subordinate requests (e.g., child requests 202, 204, 206) may include child-level requests of their own. For example, child request 202 is shown to include two children of its own (e.g., child requests 208, 210) and child request 206 is shown to include three children of its own (e.g., child requests 212, 214, 216).

Figure 3:
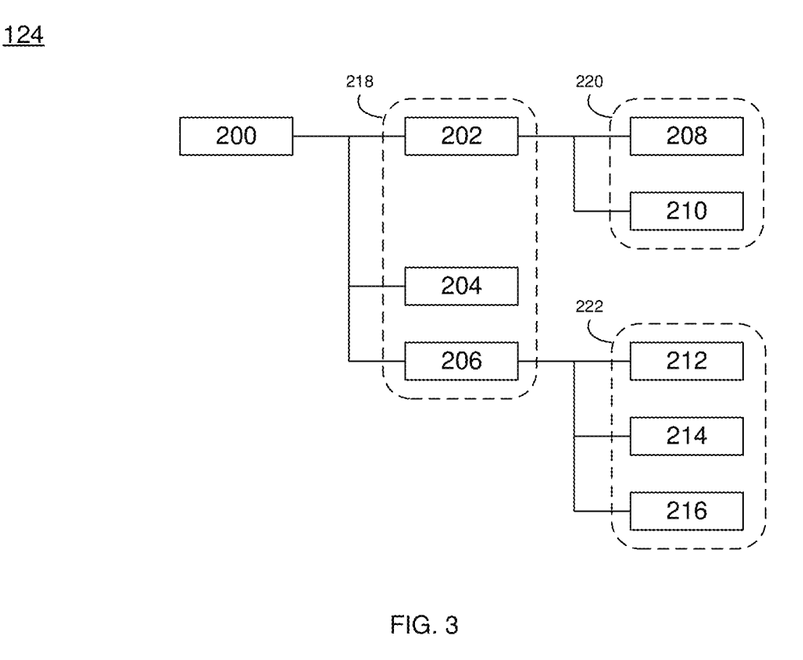
FIG. 3 is a diagrammatic view of a family of requests.

Accordingly and for the following discussion, a root request (e.g., root request 200) may be the highest level request (i.e., a request that is not subordinate to any other request), while a child request (e.g., child requests 202, 204, 206, 208, 210, 212, 214, 216) may be a request that is subordinate to any other request. For example, child requests 202, 204, 206 are subordinate to root request 200; while child requests 208, 210 are subordinate to child request 202; and child requests 212, 214, 216 are subordinate to child request 206.

When a group of child requests depend upon the same parent, this group of child requests may be referred to as siblings. For example, siblings 218 include child requests 202, 204, 206 as they depend upon the same parent (i.e., root request 200); siblings 220 include child requests 208, 210 as they depend upon the same parent (i.e., child request 202); and siblings 222 include child requests 212, 214, 216 as they depend upon the same parent (i.e., child request 206).

Concept 1 (Queuing)

Figure 4:
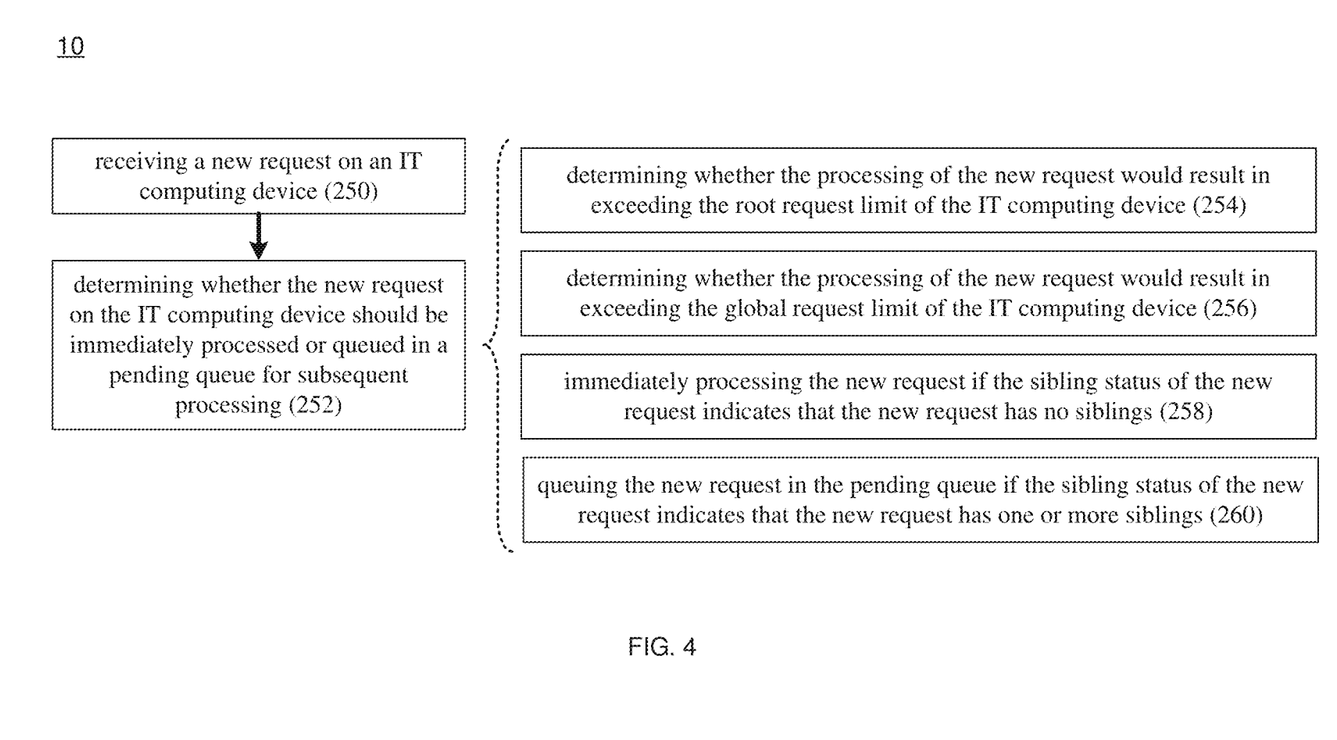
FIG. 4 is a flow chart of one implementation of the storage management process of FIG. 1.

Referring also to FIG. 4 and for the following example, assume that storage management process 10 receives 250 a new request (e.g., request 128) on an IT computing device (e.g., storage appliance 120). As discussed above, the new request (e.g., request 128) may be configured to effectuate one of the above-described processes.

Upon receiving 250 the new request (e.g., request 128), storage management process 10 may determine 252 whether the new request (e.g., request 128) on the IT computing device (e.g., storage appliance 120) should be immediately processed by the IT computing device (e.g., storage appliance 120) or queued in a pending queue (e.g., pending queue 130) for subsequent processing by the IT computing device (e.g., storage appliance 120).

As will be discussed below in greater detail, this determination 252 may be based, at least in part, upon: a root request limit (e.g., root request limit 132) of the IT computing device (e.g., storage appliance 120), a global request limit (e.g., global request limit 134) of the IT computing device (e.g., storage appliance 120), and a sibling status (e.g., sibling status 136) of the new request (e.g., request 128).

Root Request Limit: Root request limit 132 may be the maximum number of requests (root and child) that may be concurrently executing on the IT computing device (e.g., storage appliance 120) when adding a new root request for immediate processing. For example, assume that root request limit 132 is set to 8. Accordingly, no more than 7 requests (root and child) in total may be concurrently executing on the IT computing device (e.g., storage appliance 120) if a new root request is to be immediately processed. In other words, if 8 or more requests (root and child) in total are concurrently executing on the IT computing device (e.g., storage appliance 120), no new root requests may be immediately processed and all new root requests may be queued in pending queue 130 for subsequent processing by the IT computing device (e.g., storage appliance 120).

Global Request Limit: Global request limit 134 may be the maximum number of requests (root and child) that may concurrently be running on the IT computing device (e.g., storage appliance 120) when adding any new request (e.g., root or child) for immediate processing. For example, assume that global request limit 134 is set to 32. Accordingly, no more than 31 requests (root and child) in total may be concurrently executing on the IT computing device (e.g., storage appliance 120) if any new request (e.g., root or child) is to be immediately processed. In other words, if 32 or more requests (root and child) in total are concurrently executing on the IT computing device (e.g., storage appliance 120), no new request (e.g., root or child) may be immediately processed and all new requests (e.g., root or child) may be queued in pending queue 130 for subsequent processing by the IT computing device (e.g., storage appliance 120).

Sibling Status: The sibling status (e.g., sibling status 136) of the new request (e.g., request 128) may define whether the new request (e.g., request 128) has any siblings and (if so) the processing status of those siblings (e.g., are they currently being processed by storage appliance 120 or are they sitting in pending queue 130 for subsequent processing by storage appliance 120). As discussed above, when a group of child requests depend upon the same parent, this group of child requests may be referred to as siblings. For example, siblings 218 include child requests 202, 204, 206 as they depend upon the same parent (i.e., root request 200); siblings 220 include child requests 208, 210 as they depend upon the same parent (i.e., child request 202); and siblings 222 include child requests 212, 214, 216 as they depend upon the same parent (i.e., child request 206).

When determining 252 whether the new request (e.g., request 128) should be immediately processed or queued in a pending queue (e.g., pending queue 130) for subsequent processing, storage management process 10 may determine 254 whether the processing of the new request (e.g., request 128) would result in exceeding the root request limit (e.g., root request limit 132) of the IT computing device (e.g., storage appliance 120).

For example, assume that the new request (e.g., request 128) is a root request. As discussed above, root request limit 132 may be the maximum number of requests (root and child) that may be concurrently executing on the IT computing device (e.g., storage appliance 120) when adding a new root request for immediate processing. Accordingly and when making such a determination 254, storage management process 10 may a) determine if the new request (e.g., request 128) is a root request and (if so) if the immediate processing of the new request (e.g., request 128) would result in exceeding the root request limit 132. If not, the new request (e.g., request 128) may be immediately processed by storage appliance 120. And if so, the new request (e.g., request 128) may be queued within pending queue 130 for subsequent processing by storage appliance 120.

Additionally and when determining 252 whether the new request (e.g., request 128) should be immediately processed or queued in a pending queue (e.g., pending queue 130) for subsequent processing, storage management process 10 may determine 256 whether the processing of the new request (e.g., request 128) would result in exceeding the global request limit (e.g., global request limit 134) of the IT computing device (e.g., storage appliance 120).

For example, assume that the new request (e.g., request 128) is not a root request. As discussed above, global request limit 134 may be the maximum number of requests (root and child) that may concurrently be running on the IT computing device (e.g., storage appliance 120) when adding any new request (e.g., root or child) for immediate processing. Accordingly and when making such a determination 256, storage management process 10 may determine if the immediate processing of the new request (e.g., request 128) would result in exceeding global request limit 134. If not, the new request (e.g., request 128) may be immediately processed by storage appliance 120. And if so, the new request (e.g., request 128) may be queued within pending queue 130 for subsequent processing by storage appliance 120.

Further and when determining 252 whether the new request (e.g., request 128) should be immediately processed or queued in a pending queue (e.g., pending queue 130) for subsequent processing, storage management process 10 may:
- immediately process 258 the new request (e.g., request 128) if the sibling status (e.g., sibling status 136) of the new request (e.g., request 128) indicates that the new request (e.g., request 128) has no siblings; and
- queue 260 the new request (e.g., request 128) in the pending queue (e.g., pending queue 130) if the sibling status (e.g., sibling status 136) of the new request (e.g., request 128) indicates that the new request (e.g., request 128) has one or more siblings.

The one or more siblings may include: one or more requests (e.g., requests 138) currently being processed by the IT computing device (e.g., storage appliance 120); and/or one or more requests (e.g., requests 140) waiting in the pending queue (e.g., pending queue 130) to be processed by the IT computing device (e.g., storage appliance 120). Requests 138 and/or requests 140 may be timestamped, wherein these timestamps may identify the time at which these requests were issued by (received on) the IT computing device (e.g., storage appliance 120). Additionally, requests 138 and/or requests 140 may each be assigned a priority (e.g., low/medium/high) so that e.g., higher priority requests may be executed before lower priority requests.

As discussed above, if a replication process to be effectuated includes one or more child requests (e.g., a first sub-request to define a LUN target on remote storage appliance 126, a second sub-request to copy the data from storage appliance 120 to remote storage appliance 126, and a third sub-request to error-check the replication copy on remote storage appliance 126), the processing of each of these child requests is a prerequisite for the completion of the root request (i.e., the replication process). In other words, the failure of any of these child requests to be successfully processed would result in the failure of the parent request to be completed.

Accordingly, if a request does not have any siblings, the queuing of that request in pending queue 130 may result in the processing of the related parent request stopping. Therefore and to avoid such a deadlock situation, storage management process 10 may immediately process 258 request 128 if sibling status 136 of request 128 indicates that request 128 has no siblings.

Concept 2 (Dequeuing)

The above discussion concerned the manner in which new requests (e.g., request 128) were processed by storage management process 10 upon receipt 250, wherein storage management process 10 determined 252 whether these new requests (e.g., request 128) are immediately processed by storage appliance 120 or queued within pending queue 130 for subsequent processing by storage appliance 120. The following discussion concerns the subsequent processing of the requests stored within pending queue 130.

Figure 5:
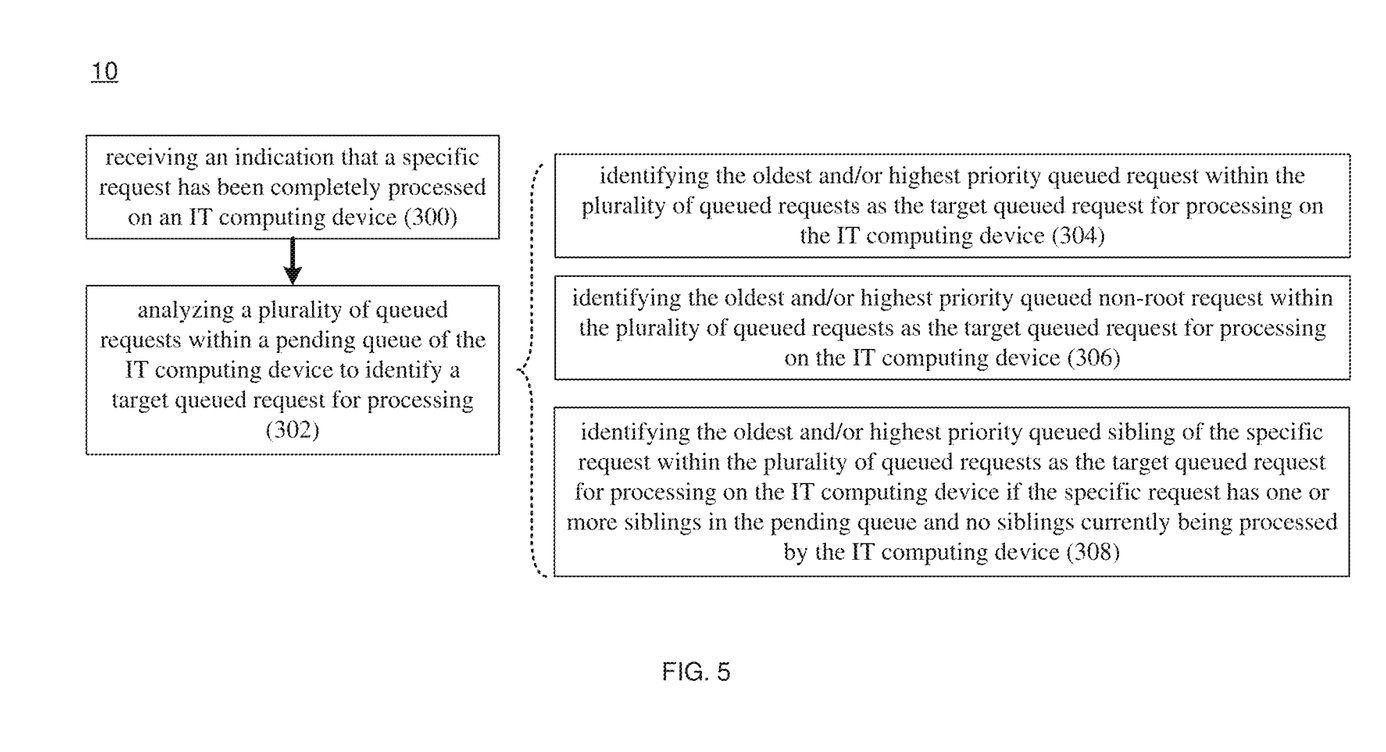
FIG. 5 is a flow chart of another implementation of the storage management process of FIG. 1.

Referring also to FIG. 5, storage management process 10 may receive 300 an indication (e.g., indication 142) that a specific request (e.g., request 144) has been completely processed on the IT computing device (e.g., storage appliance 120). Accordingly, the IT computing device (e.g., storage appliance 120) may now be capable of processing a request that had been previously queued in pending queue 130. Therefore, storage management process 10 may analyze 302 a plurality of queued requests (e.g., requests 140) within the pending queue (e.g., pending queue 130) of the IT computing device (e.g., storage appliance 120) to identify a target queued request (e.g., target queued request 146) for processing based, at least in part, upon: a root request limit (e.g., root request limit 132) of the IT computing device (e.g., storage appliance 120), a global request limit (e.g., global request limit 134) of the IT computing device (e.g., storage appliance 120), and a sibling status (e.g., sibling status 148) of the specific request (e.g., request 144).

As discussed above:
- Root request limit 132 may be the maximum number of requests (root and child) that may be concurrently executing on the IT computing device (e.g., storage appliance 120) when adding a new root request for immediate processing.
- Global request limit 134 may be the maximum number of requests (root and child) that may concurrently be running on the IT computing device (e.g., storage appliance 120) when adding any new request (e.g., root or child) for immediate processing.
- Sibling status (e.g., sibling status 148) of the specific request (e.g., request 144) may define whether the specific request (e.g., request 144) has any siblings and (if so) the processing status of those siblings (e.g., are they currently being processed by storage appliance 120 or are they sitting in pending queue 130 for subsequent processing by storage appliance 120).

For the following example, assume that the IT computing device (e.g., storage appliance 120) is currently under the root request limit (e.g., root request limit 132). In this example, that means that less than 8 requests (in total) are concurrently being processed by storage appliance 120. When analyzing 302 a plurality of queued requests (e.g., requests 140) within a pending queue (e.g., pending queue 130) of the IT computing device (e.g., storage appliance 120) to identify a target queued request (e.g., target queued request 146) for processing, storage management process 10 may identify 304 the oldest and/or highest priority queued request within the plurality of queued requests (e.g., requests 140) as the target queued request (e.g., target queued request 146) for processing on the IT computing device (e.g., storage appliance 120).

The pending queue (e.g., pending queue 130) may include a global queue (e.g., global queue 150) and the oldest and/or highest priority queued request may be defined within the global queue (e.g., global queue 150). For example, global queue 150 may be a global list of all requests (both root and child) queued within pending queue 130. Accordingly and when storage management process 10 identifies 304 the oldest and/or highest priority queued request within requests 140 as target queued request 146 for processing on storage appliance 120, storage management process 10 may simply select the oldest and/or highest priority queued request defined within global queue 150. In one implementation, global queue 150 may include a plurality of pointers that point to the actual requests that may be defined within database 154.

For the following example, assume that the IT computing device (e.g., storage appliance 120) is currently over the root request limit (e.g., root request limit 132) but under the global request limit (e.g., global request limit 134). In this example, that means that 8 or more requests but less than 32 requests (in total) are concurrently being processed by storage appliance 120. When analyzing 302 a plurality of queued requests (e.g., requests 140) within a pending queue (e.g., pending queue 130) of the IT computing device (e.g., storage appliance 120) to identify a target queued request (e.g., target queued request 146) for processing, storage management process 10 may identify 306 the oldest and/or highest priority queued non-root request within the plurality of queued requests (e.g., requests 140) as the target queued request (e.g., target queued request 146) for processing on the IT computing device (e.g., storage appliance 120).

The pending queue (e.g., pending queue 130) may include a child queue (e.g., child queue 152) and the oldest and/or highest priority queued non-root request may be defined within the child queue (e.g., child queue 152). For example, child queue 152 may be a list of all non-root requests (only child requests . . . no root requests) queued within pending queue 130. Accordingly and when storage management process 10 identifies 306 the oldest and/or highest priority queued non-root request within the plurality of queued requests 140 as target queued request 146 for processing on storage appliance 120, storage management process 10 may simply select the oldest and/or highest priority queued request defined within child queue 152. In one implementation, child queue 152 may include a plurality of pointers that point to the actual requests that may be defined within database 154.

For the following example, assume that the IT computing device (e.g., storage appliance 120) is currently over the global request limit (e.g., global request limit 134). In this example, that means that 32 or more requests (in total) are concurrently being processed by storage appliance 120. When analyzing 302 a plurality of queued requests (e.g., requests 140) within a pending queue (e.g., pending queue 130) of the IT computing device (e.g., storage appliance 120) to identify a target queued request (e.g., target queued request 146) for processing, storage management process 10 may identify 308 the oldest and/or highest priority queued sibling of the specific request (e.g., request 144) within the plurality of queued requests (e.g., requests 140) as the target queued request (e.g., target queued request 146) for processing on the IT computing device (e.g., storage appliance 120) if the specific request (e.g., request 144) has one or more siblings in the pending queue (e.g., pending queue 130) and no siblings currently being processed by the IT computing device (e.g., storage appliance 120).

As discussed above, if a request does not have any siblings, the queuing of that request in pending queue 130 may result in the processing of the related parent request stopping. Therefore and to avoid such a deadlock situation, storage management process 10 may immediately process a request if the sibling status of request indicates that request has no siblings. Similarly, if the processing of the specific request (e.g., request 144) is completed and the specific request (e.g., request 144) has one or more siblings in pending queue 130 but no siblings currently being processed by storage appliance 120, the oldest and/or highest priority queued sibling of the specific request (e.g., request 144) within the plurality of queued requests (e.g., requests 140) should be processed on the IT computing device (e.g., storage appliance 120) to avoid deadlock situation.

The pending queue (e.g., pending queue 130) may include a sibling queue (e.g., sibling queue 156) and the oldest and/or highest priority queued sibling of the specific request (e.g., request 144) may be defined within the sibling queue (e.g., sibling queue 156). For example, sibling queue 156 may be a list of all sibling requests (requests that have a parent . . . wherein the parent has other children) queued within pending queue 130. Accordingly and when storage management process 10 identifies 306 the oldest and/or highest priority queued non-root request within the plurality of queued requests 140 as target queued request 146 for processing on storage appliance 120, storage management process 10 may simply select the oldest and/or highest priority queued request defined within sibling queue 156. In one implementation, sibling queue 156 may include a plurality of pointers that point to the actual requests that may be defined within database 154.

During operation of pending queue 130 (generally) and global queue 150/child queue 152/sibling queue 156 (specifically), storage management process 10 may annotate the entries within these queues to identify the status of the entry (e.g., to mark them stale) and enable the removal of redundant/subset entries from one queue when it is removed from another queue.

For example:

When you dequeue the highest-priority request from global queue 150, storage management process 10 may also dequeue the highest-priority request from "subset" queues (e.g., child queue 152 and sibling queue 156), since the same entry will be the highest-priority in all three queues (e.g., global queue 150/child queue 152/sibling queue 156). Accordingly, the next time that storage management process 10 dequeues from child queue 152 and/or sibling queue 156, storage management process 10 does not end up dequeuing a request that was already processed when a request was dequeued from global queue 150. In a similar fashion, when storage management process 10 dequeues a request from child queue 152, storage management process 10 may also dequeue the corresponding request from sibling queue 156.

When you dequeue a request from child queue 152 and/or sibling queue 156, that means that the same request is also present in a queue (or queues) that contain a superset of requests from the queue that storage management process 10 dequeued from. However, storage management process 10 does not know for sure whether the request that was dequeued is also the highest-priority request in the superset queue(s). Accordingly, storage management process 10 cannot simply dequeue the highest-priority entry from those queues. Accordingly, storage management process 10 may mark the request as "stale". That way, when storage management process 10 subsequently dequeues the same request from the global queue (or, in the case where storage management process 10 originally dequeued from a sibling queue, when we later dequeue the same request from either the global or non-root queue), storage management process 10 may see the request marked as "stale". Therefore, storage management process 10 may ignore/discard the "stale" request and dequeue the next highest-priority request.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving a new request on an IT computing device; and
   determining whether the new request on the IT computing device should be immediately processed or queued in a pending queue for subsequent processing based, at least in part, upon:
      a root request limit of the IT computing device,
      a global request limit of the IT computing device, and
      a sibling status of the new request, wherein:
         the root request limit is a maximum number of root and child requests that may concurrently be running on the IT computing device when adding a new root request for immediate processing,
         the global request limit is a maximum number of root and child requests that may concurrently be running on the IT computing device when adding any new request for immediate processing, and
         the sibling status of the new request defines whether the new request has any siblings and a processing status of one or more siblings if the sibling status of the new request indicates that the new request has the one or more siblings.

2. The computer-implemented method of claim 1 wherein the new request is a root request and determining whether the new request should be immediately processed or queued in a pending queue for subsequent processing includes:
   determining whether the processing of the new request would result in exceeding the root request limit of the IT computing device.

3. The computer-implemented method of claim 1 wherein the new request is not a root request and determining whether the new request should be immediately processed or queued in a pending queue for subsequent processing includes:
   determining whether the processing of the new request would result in exceeding the global request limit of the IT computing device.

4. The computer-implemented method of claim 1 wherein the new request is not a root request and determining whether the new request should be immediately processed or queued in a pending queue for subsequent processing includes:
   immediately processing the new request if the sibling status of the new request indicates that the new request has no siblings.

5. The computer-implemented method of claim 1 wherein the new request is not a root request and determining whether the new request should be immediately processed or queued in a pending queue for subsequent processing includes:
   queuing the new request in the pending queue if the sibling status of the new request indicates that the new request has one or more siblings.

6. The computer-implemented method of claim 5 wherein the one or more siblings includes:
   one or more requests currently being processed by the IT computing device; and/or
   one or more requests waiting in the pending queue to be processed by the IT computing device.

7. A computer program product residing on a non-transitory computer readable medium having a plurality of instructions stored thereon which, when executed by a processor, cause the processor to perform operations comprising:
   receiving a new request on an IT computing device; and
   determining that the new request on the IT computing device should be queued in a pending queue for subsequent processing based, at least in part, upon:
      a root request limit of the IT computing device,
      a global request limit of the IT computing device, and
      a sibling status of the new request, wherein:
         the root request limit is a maximum number of root and child requests that may concurrently be running on the IT computing device when adding a new root request for immediate processing,
         the global request limit is a maximum number of root and child requests that may concurrently be running on the IT computing device when adding any new request for immediate processing, and
         the sibling status of the new request defines whether the new request has any siblings and a processing status of one or more siblings if the sibling status of the new request indicates that the new request has the one or more siblings; and
   queuing the new request on the IT computing device in the pending queue in response to determining that the sibling status of the new request indicates that the new request has the one or more siblings.

8. The computer program product of claim 7 wherein the new request is a root request and determining whether the new request should be immediately processed or queued in a pending queue for subsequent processing includes:
   determining whether the processing of the new request would result in exceeding the root request limit of the IT computing device.

9. The computer program product of claim 7 wherein the new request is not a root request and determining whether the new request should be immediately processed or queued in a pending queue for subsequent processing includes:
   determining whether the processing of the new request would result in exceeding the global request limit of the IT computing device.

10. The computer program product of claim 7 wherein the new request is not a root request and determining whether the new request should be immediately processed or queued in a pending queue for subsequent processing includes:
    immediately processing the new request if the sibling status of the new request indicates that the new request has no siblings.

11. The computer program product of claim 7, wherein the one or more siblings includes: one or more requests currently being processed by the IT computing device; and/or one or more requests waiting in the pending queue to be processed by the IT computing device.

12. A computing system including a processor and memory configured to perform operations comprising:
    receiving a new request on an IT computing device; and
    determining that the new request on the IT computing device should be immediately processed based, at least in part, upon:

a root request limit of the IT computing device,
a global request limit of the IT computing device, and
a sibling status of the new request, wherein:
- the root request limit is a maximum number of root and child requests that may concurrently be running on the IT computing device when adding a new root request for immediate processing,
- the global request limit is a maximum number of root and child requests that may concurrently be running on the IT computing device when adding any new request for immediate processing, and
- the sibling status of the new request defines whether the new request has any siblings and a processing status of one or more siblings if the sibling status of the new request indicates that the new request has the one or more siblings; and immediately processing the new request in response to determining that the sibling status of the new request indicates that the new request has no siblings.

13. The computing system of claim 12 wherein the new request is a root request and determining whether the new request should be immediately processed or queued in a pending queue for subsequent processing includes:
determining whether the processing of the new request would result in exceeding the root request limit of the IT computing device.

14. The computing system of claim 12 wherein the new request is not a root request and determining whether the new request should be immediately processed or queued in a pending queue for subsequent processing includes:
determining whether the processing of the new request would result in exceeding the global request limit of the IT computing device.

15. The computing system of claim 12 wherein the new request is not a root request and determining whether the new request should be immediately processed or queued in a pending queue for subsequent processing includes:
queuing the new request in the pending queue if the sibling status of the new request indicates that the new request has the one or more siblings.

16. The computing system of claim 15 wherein the one or more siblings includes:
one or more requests currently being processed by the IT computing device; and/or
one or more requests waiting in the pending queue to be processed by the IT computing device.

* * * * *